United States Patent
Puttoju et al.

(10) Patent No.: US 11,176,183 B2
(45) Date of Patent: Nov. 16, 2021

(54) SYSTEM AND METHOD TO CONFIGURE A FLOW ALGORITHM AUTOMATICALLY BY USING A PRIMARY ELEMENT DATA SHEET IN MULTIVARIABLE SMART LINE TRANSMITTERS

(71) Applicant: Honeywell International Inc., Morris Plains, NJ (US)

(72) Inventors: Malla Achary Puttoju, Hyderabad (IN); Asha Gottipati, Hyderabad (IN); Pavan Malayanur, Hyderabad (IN); Surya Raichor, Hyderabad (IN); Jaganmohan Y Reddy, Hyderabad (IN)

(73) Assignee: Honeywell International Inc., Charlotte, NC (US)

( * ) Notice: Subject to any disclaimer, the term of this patent is extended or adjusted under 35 U.S.C. 154(b) by 160 days.

(21) Appl. No.: 15/911,597

(22) Filed: Mar. 5, 2018

(65) Prior Publication Data

US 2019/0272340 A1 Sep. 5, 2019

(51) Int. Cl.
G06F 16/31 (2019.01)
G06F 16/34 (2019.01)
G05B 19/408 (2006.01)
G05B 19/042 (2006.01)

(52) U.S. Cl.
CPC ....... *G06F 16/313* (2019.01); *G05B 19/0426* (2013.01); *G05B 19/4083* (2013.01); *G06F 16/345* (2019.01); *G05B 2219/23376* (2013.01)

(58) Field of Classification Search
CPC .. G06F 16/313; G06F 16/345; G05B 19/4083
See application file for complete search history.

(56) References Cited

U.S. PATENT DOCUMENTS

| | | | |
|---|---|---|---|
| 7,024,417 B1* | 4/2006 | Russakovsky | G06F 16/2465 |
| 7,207,038 B2* | 4/2007 | Bicsak | G06F 8/433 |
| | | | 703/21 |
| 7,392,255 B1* | 6/2008 | Sholtis | G06F 16/256 |
| 7,761,320 B2* | 7/2010 | Fliess | G06Q 10/04 |
| | | | 705/7.14 |

(Continued)

FOREIGN PATENT DOCUMENTS

EP 2813909 A1 12/2014

OTHER PUBLICATIONS

Datasheet—Wikipedia, Oct. 4, 2014.
Extended European Search Report, Application No. EP 19 16 0654, dated Apr. 25, 2019.

*Primary Examiner* — Richard L Bowen
(74) *Attorney, Agent, or Firm* — Ortiz & Lopez, PLLC; Luis M. Ortiz; Kermit D. Lopez

(57) ABSTRACT

An apparatus, method, and non-transitory computer readable medium provide for configuring a flow algorithm automatically by using a primary element data sheet in multivariable smart line transmitters. The apparatus includes a memory and at least one processor operably connected to the memory. The at least one processor receives a datasheet and an algorithm related to a device in an industrial process and control system, extracts parameters from the datasheet, maps parameters to algorithm items related to the algorithm, generates a template based on the algorithm items and the mapped parameters, and downloads the template to the device.

17 Claims, 6 Drawing Sheets

(56) References Cited

U.S. PATENT DOCUMENTS

| | | | |
|---|---|---|---|
| 8,489,342 B2 | 7/2013 | Dugger et al. | |
| 8,712,705 B2* | 4/2014 | Meier | G01D 1/00 700/281 |
| 8,713,049 B2* | 4/2014 | Jain | G06F 16/2452 707/779 |
| 9,280,752 B2* | 3/2016 | Pandrangi | G06Q 10/06 |
| 2004/0034658 A1* | 2/2004 | Potter | G01D 3/022 |
| 2005/0123884 A1 | 1/2005 | Walls et al. | |
| 2013/0275451 A1* | 10/2013 | Lewis | G06Q 10/063 707/758 |
| 2014/0371882 A1* | 12/2014 | Nikhra | G05B 19/0423 700/89 |
| 2016/0117184 A1 | 4/2016 | Sundaresan et al. | |
| 2016/0147777 A1* | 5/2016 | Gade | G06F 16/116 718/104 |
| 2016/0371603 A1* | 12/2016 | A V | G06F 16/95 |
| 2017/0132200 A1* | 5/2017 | Noland | G06F 40/186 |

* cited by examiner

FIG. 6

Configuration Details

Protocol: HART
Manufacturer: Honeywell_23
Device Type: SMV800
Device Revision: 1
DD Revision: 2

[Create]

Configuration View

605 — ☐ View SymbolName  ☐ View IDs  ☑ Select All

| | Item Label | Value | Units | Select |
|---|---|---|---|---|
| 🔑 | Bore Material | 304 Stainless Steel ▼ | | ☑ |
| 🔑 | Pipe Material | 304 Stainless Steel ▼ | | ☑ |
| 🔑 | Inter Control Interval_Ty | 0.5 | Year | ☐ |
| 🔑 | Init Radius_rGOST(mm)/Seg Heigh | 0.002 | inch | ☐ |
| 🔑 | Pipe Roughness_RaGOST/BetaFact | 0.0001 | inch | ☐ |
| 🔑 | Diff Pressure Sizing VCone_DPMax | 1 | inH2O@39 | ☐ |
| 🔑 | Max FlowRate Sizing VCone_Qmax, | 1 | | ☐ |
| 🔑 | Design Density | 1 | lbm/ft3 | ☑ |
| 🔑 | Design Temp | 0 | degF | ☑ |
| 🔑 | Design Pressure | 14.729999542 | PSIA | ☑ |
| 🔑 | Base(std)Density | 1 | lbm/ft3 | ☐ |
| 🔑 | Nominal Abs Press | 14.729999542 | PSIA | ☑ |
| 🔑 | Nominal Temp | 0 | degF | ☑ |
| 🔑 | Man Input Temp Exp Fact Fa | 1 | | ☐ |
| 🔑 | Man Input Exp Fact Y | 1 | | ☐ |
| 🔑 | Hi Lim Reynol Num_RnMax | 100000 | | ☐ |
| 🔑 | Lo Lim Reynol Num_RnMin | 5000 | | ☐ |
| 🔑 | Reynolds Coeff_r2 | 0 | | ☐ |
| 🔑 | Reynolds Coeff_r1 | 1 | | ☐ |
| 🔑 | man Input Cd | 1 | | ☐ |
| 🔑 | Hi Temp Lim Visco_TuMax | 212 | degF | ☑ |
| 🔑 | Lo Temp Lim Visco_TuMin | 32 | degF | ☑ |
| 🔑 | Viscosity Coeff_V5 | 0 | cP | ☑ |
| 🔑 | Viscosity Coeff_V4 | 0 | cP | ☑ |
| 🔑 | Viscosity Coeff_V3 | 0 | cP | ☑ |
| 🔑 | Viscosity Coeff_V2 | 0 | cP | ☑ |
| 🔑 | Viscosity Coeff_V1 | 0 | cP | ☑ |
| 🔑 | Man Input Viscos | 0.01 | cP | ☐ |
| 🔑 | Hi Temp Lim Dens_TpMax | 212 | | ☐ |
| 🔑 | Lo Temp Lim Dens_TpMin | 32 | | ☐ |
| 🔑 | Density Coeff_d5 | 0 | lb/ft3 | ☐ |
| 🔑 | Density Coeff_d4 | 0 | lb/ft3 | ☐ |

[Save] [Save As] [Close]

SYSTEM AND METHOD TO CONFIGURE A FLOW ALGORITHM AUTOMATICALLY BY USING A PRIMARY ELEMENT DATA SHEET IN MULTIVARIABLE SMART LINE TRANSMITTERS

TECHNICAL FIELD

This disclosure relates generally to advance process control (APC) sensors. More specifically, this disclosure relates to methods and systems to configure a flow algorithm automatically by using a primary element data sheet in multivariable smart line transmitters.

BACKGROUND

Configuring flow algorithms is very complex in smartline multivariable (SMV) transmitters. The complexity causes many of the customers to face issues in flow algorithm configuration, where few professionals can configure these algorithms without any issues. Many parameters with respect to primary elements and design conditions need to be entered while configuring complex algorithms in multivariable transmitter. Where to enter each parameter and what units to be entered for each parameter is not obvious for the end user. Most of the time the end user will not get the expected parameter value (PV) due to a mismatch in the parameters entered or a mismatch in the units supposed to be entered. Technical assistance centers (TACs) are approached for a majority of configuration failures, resulting in downtime and customer dissatisfaction until configuration failure is attended to.

It is difficult for an engineering team to support customers on the fly with minimum data available to them, and it may take up to two days to resolve configuration issues by extracting required data from a datasheet. Percentage of sales is very low due to complexity in flow configurations.

SUMMARY

This disclosure provides methods and systems to configure a flow algorithm automatically by using a primary element data sheet in multivariable smart line transmitters.

In a first embodiment, an apparatus including a memory and one or more processors operably connected to the memory is provided. The one or more processors are configured to receive a datasheet and an algorithm related to a device in an industrial process and control system, extract parameters from the datasheet, map parameters to algorithm items related to the algorithm, generate a template based on the algorithm items and the mapped parameters, and download the template to the device.

In a second embodiment, a method is provided. The method includes receiving a datasheet and an algorithm related to a device in an industrial process and control system, extracting parameters from the datasheet, mapping parameters to algorithm items related to the algorithm, generating a template based on the algorithm items and the mapped parameters, and downloading the template to the device.

In a third embodiment, a non-transitory computer readable medium is provided. The computer readable medium machine-readable medium is encoded with executable instructions that, when executed, cause one or more processors to receive a datasheet and an algorithm related to a device in an industrial process and control system, extract parameters from the datasheet, map parameters to algorithm items related to the algorithm, generate a template based on the algorithm items and the mapped parameters, and download the template to the device.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 4-6 illustrate exemplary interfaces for configuring a flow algorithm automatically by using a primary element data sheet in a multivariable transmitter according to this disclosure.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

Figure 1:
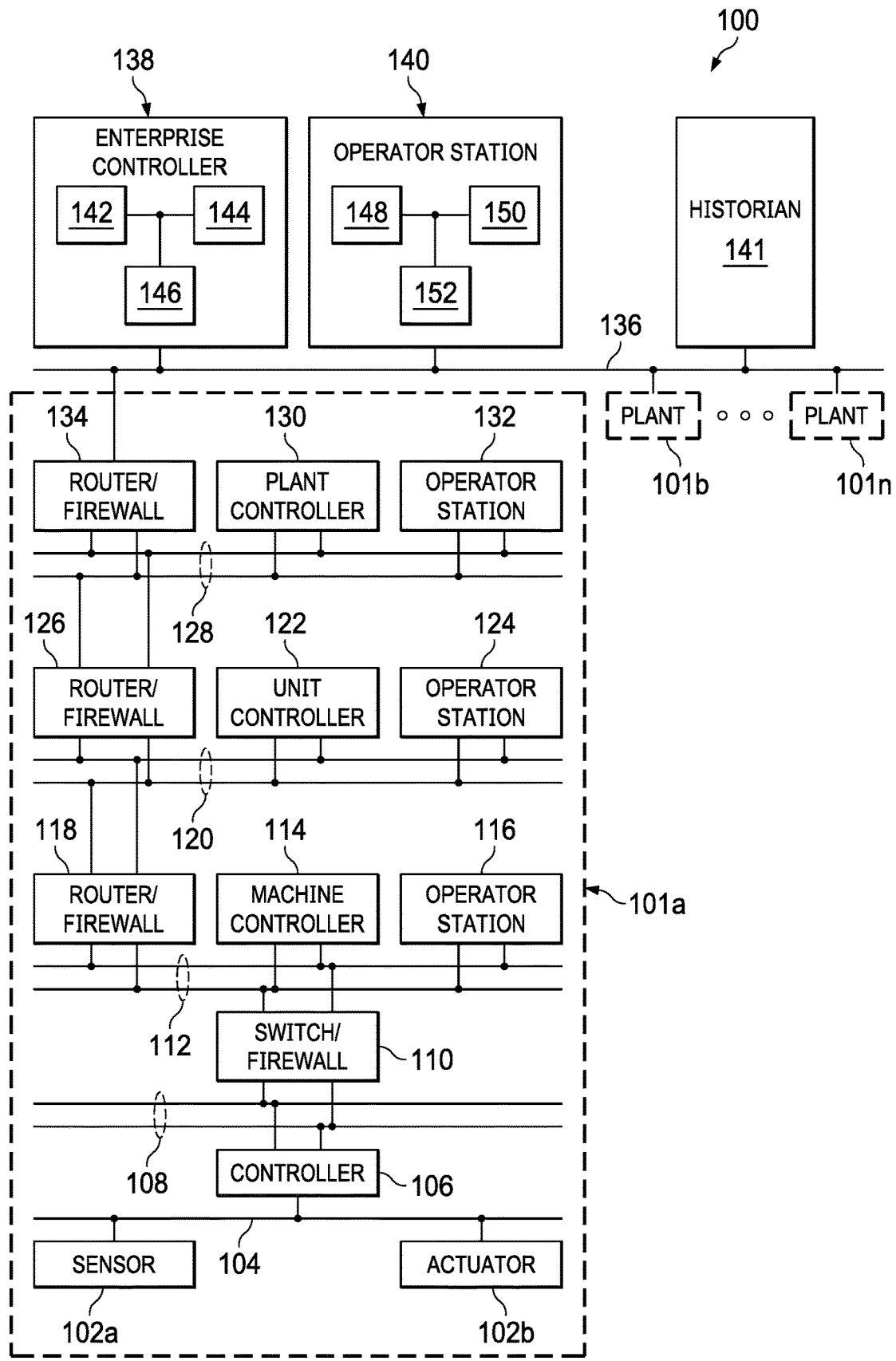
FIG. 1 illustrates an example industrial control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, flow rate, or a voltage transmitted through a cable. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS (FF) network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

In accordance with this disclosure, various components of the system 100 support a process for configuring a flow algorithm automatically by using a primary element data sheet in a multivariable transmitter according to this disclosure in the system 100. For example, one or more of the interfaces 146, 152 could indicate different aspects of a system where the process controls are automatically entered and reviewed, as described in greater detail below.

Although FIG. 1 illustrates one example of an industrial process control and automation system 100, various changes may be made to FIG. 1. For example, a control system could include any number of sensors, actuators, controllers, servers, operator stations, and networks. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs.

Figure 2:
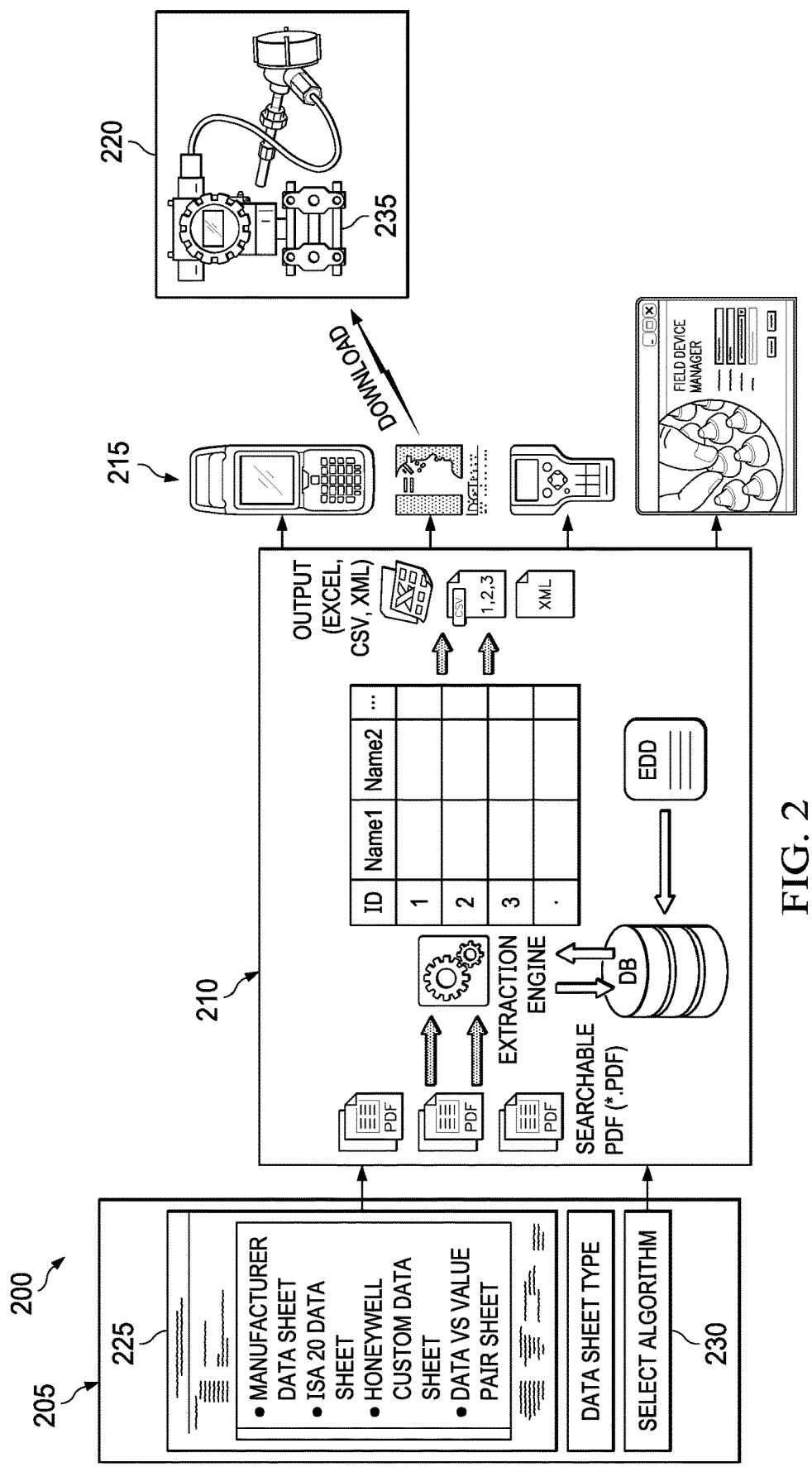
FIG. 2 illustrates a block diagram for configuring a flow algorithm automatically by using a primary element data sheet in a multivariable transmitter according to this disclosure.

FIG. 2 illustrates a block diagram 200 for configuring a flow algorithm automatically by using a primary element data sheet in a multivariable transmitter according to this disclosure. The embodiment of the block diagram 200 illustrated in FIG. 2 is for illustration only. FIG. 2 does not limit the scope of this disclosure to any particular embodiment.

The block diagram 200 includes inputs 205, data extraction 210, interfacing 215, and device download 220. The inputs 205 include selection of a data sheet 225 and an algorithm 230 for the device 235. Device 235 can be a multivariable transmitter or a device that is controlled by controller 106, such as the sensor 102a or the actuator 102b.

The inputs 205 can be a data sheet type or a data sheet 225 and the algorithm 230. Examples of the data sheet type could include a manufacturer data sheet, an ISA S20 data sheet, a custom data sheet, a data Vs Value Pair sheet, etc. The user inputs 205 are given to the system 100 for processing. The data extraction 210 is described in greater detail in regards to FIG. 3. The interfacing 215 can include different intermediate devices for reviewing and accepting of a generated template. The generated template is sent as a device download 220 to the device 235. The device 235 downloads the template and operates in the system using the download template.

Figure 3:
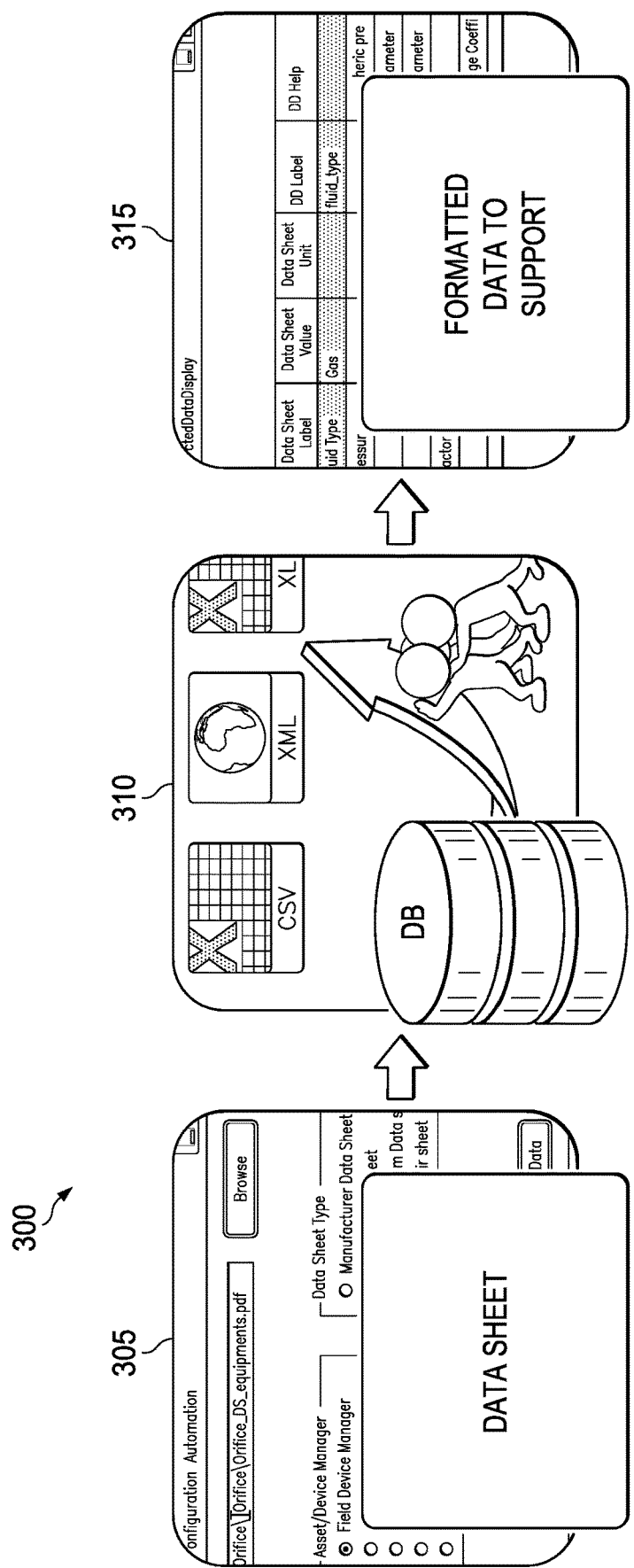
FIG. 3 illustrates a block diagram for data extraction according to this disclosure.

FIG. 3 illustrates a block diagram 300 for data extraction according to this disclosure. The embodiment of the block diagram 300 illustrated in FIG. 3 is for illustration only. FIG. 3 does not limit the scope of this disclosure to any particular embodiment.

The user initiates extraction 305 of the data in the data sheet 225 and the system 100 extracts the data sheet elements that are in the data sheet. Extraction 305 of the required data involves various document-processing algorithms and mapping the algorithms with the device description (DD) based symbol names, labels, and description. A device 235 can use a variety of readily available natural language and semantic processing techniques to match the data to possible accuracy. The data sheet elements are stored in a database 310 and the system maps the parameters corresponding to data sheet elements in the DD file 315. The DD file 315 is a file required to configure a work device or field device.

Figures 4, 5:
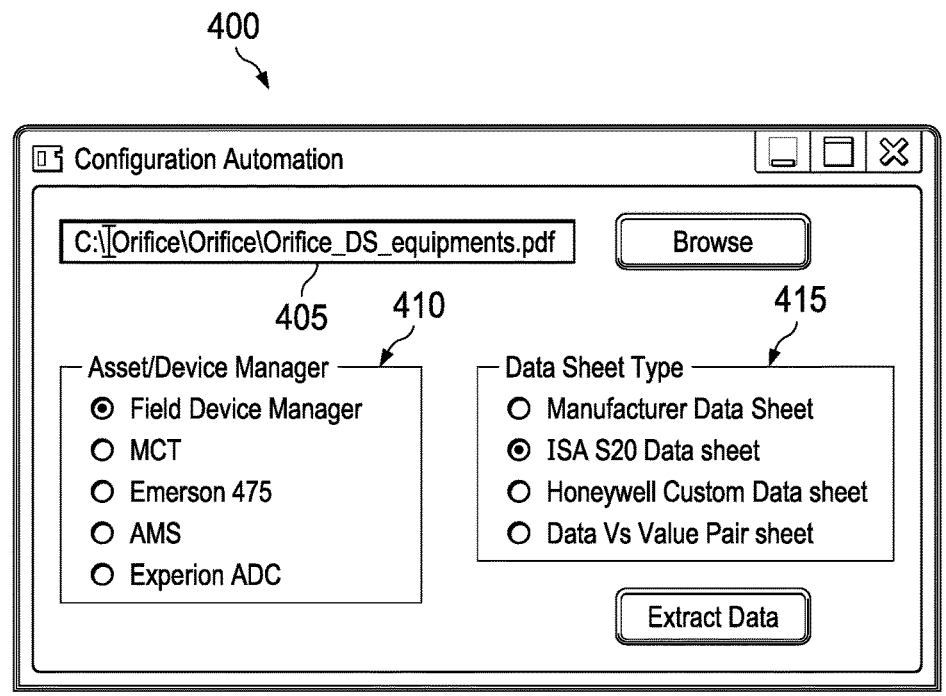

FIGS. 4-6 illustrate different exemplary interfaces 400, 500, 600 for configuring a flow algorithm automatically by using a primary element data sheet in a multivariable transmitter according to this disclosure. The embodiments of the interfaces 400, 500, 600 illustrated in FIGS. 4-6 are for illustration only. FIGS. 4-6 do not limit the scope of this disclosure to any particular implementation.

FIG. 4 illustrates a user interface 400 for a configuration for selecting a primary data sheet and flow algorithm to automatically configure in a device. The user interface 400 includes a data sheet input 405, an asset or device manager type input 410 and a data sheet type input 415. The data sheet input 405 locates the data sheet that contains values to be mapped and downloaded to the device. The asset/device manager input 410 indicates the type of device the data sheet is downloaded to. The data sheet type input 415 indicates the type of data sheet for formatting purposes. The asset/device manager input 410 and the data sheet type input 415 determine the algorithm used for the mapping.

FIG. 5 illustrates an exemplary interface 500 for the extracted variables from the data sheet and the mapped values to the DD file according to this disclosure. The interface 500 includes data sheet labels 505, data sheet values 510, data sheet units 515, corresponding DD label 520, and DD help 525 for each variable 530 and a generate template input 535. Each algorithm has different terminology for the labels 520, which DD labels are one example of algorithm labels. The DD help 525 is the description or help text provided with the DD label 520.

FIG. 6 illustrates an interface 600 with the template 605 for an asset management system. The template 605 includes all the values that have been configured from the datasheet and are presented to the user. The template 605 includes all the information to be downloaded to the device 325. The template 605 allows for a user to select or deselect specific items or variables in the template 605. The template 605 is used for validation from the user and is downloaded directly to the device 325.

Figure 7:
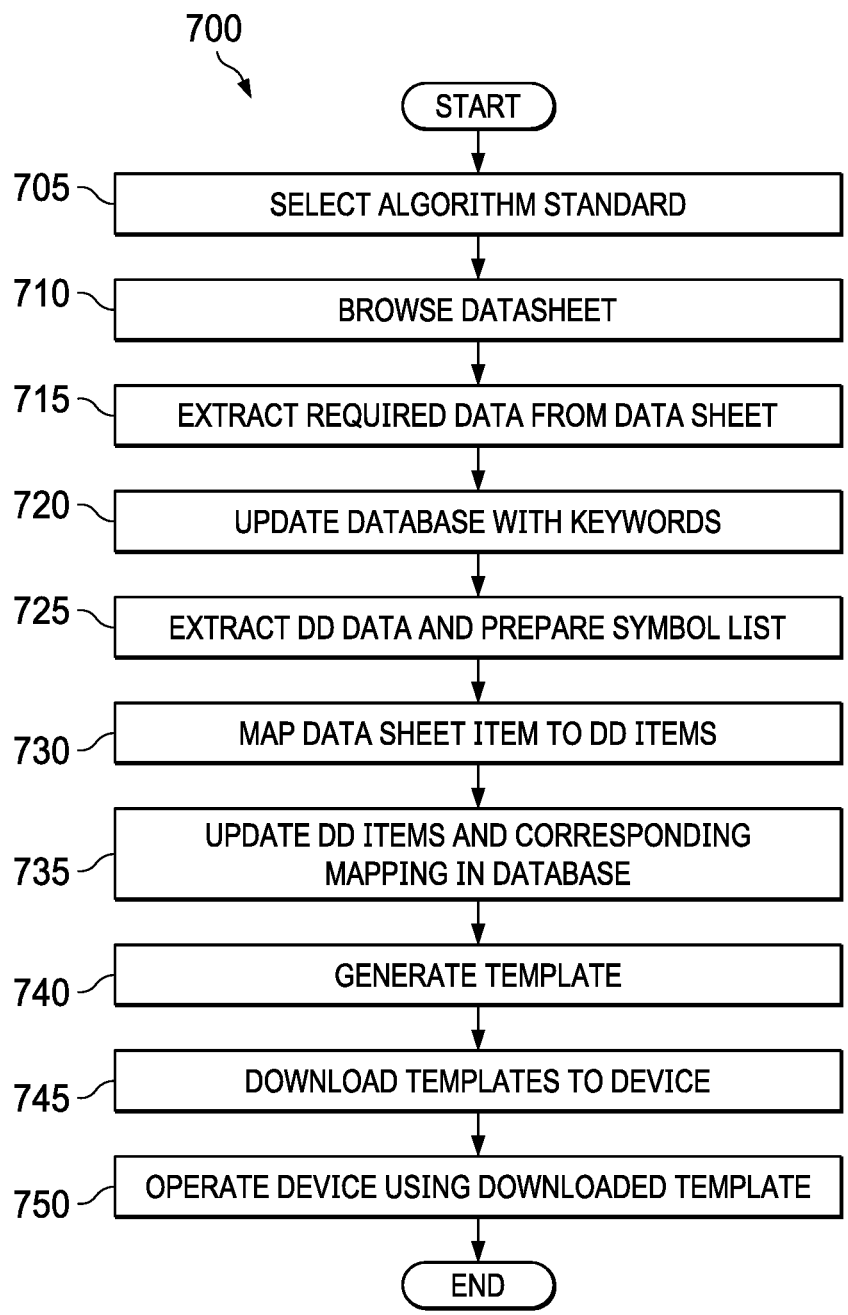
FIG. 7 illustrates an example method for configuring a flow algorithm automatically by using a primary element data sheet in a multivariable transmitter according to this disclosure.

FIG. 7 illustrates an example method for configuring a flow algorithm automatically by using a primary element data sheet in a multivariable transmitter according to this disclosure. The process depicted in FIG. 7 is described as being performed in conjunction with the controller 106, processing device 142, or processing device 148 illustrated in FIG. 1.

In operation 705, the controller 106 selects an algorithm standard. An interface 400 includes an asset/device manager input 410, which provides for the algorithm standard or algorithm input. The interface 400 also includes a data sheet input and a data sheet type input. The interface 400 can receive a user initiation to initiate reception of the datasheet and algorithm. For example, a DD algorithm standard is used in this application. The description of the DD algorithm is not limiting this disclosure to only DD algorithms.

In operation 710, the controller 106 browses a data sheet. The data sheet can include, for example, vender details, primary element data and an algorithm type. The data sheet can be a pdf, data file, etc. The data sheet contains different fields, such a variable name, variable value, variable description, etc. The data sheet cannot be download directly to the device, but contains values to be provided to the DD file. The DD file is a binary file that is used to upload the value from the data sheet to configure the device.

In operation 715, the controller 106 extracts required data from the data sheet. An extraction component extracts the required data from a supplied data sheet.

In operation 720, the controller 106 updates a database with keywords. If a new data sheet is present, the knowledge base is expanded with new keywords and data, providing a reduced or minimalized required user interaction.

In operation 725, the controller 106 extracts DD data and a list of symbols. The DD engine extracts the DD and then prepares the symbol list based on the selected algorithm. The DD engine understands the DD file within the work device or field device. The DD engine maps the DD parameters with the key words.

In operation 730, the controller 106 map data sheet items to DD items. An algorithm maps the parameters and DD items based on previous knowledge acquired in operations 710-720. The terminology of the data sheet and the terminology of the programming of the device may not be the same, which is enhanced by the mapping of the parameters to the DD values.

In operation 735, the controller 106 updates DD items and corresponding mapping in database. The controller 106 can present the mapping with values to the user for user acceptance or correction. The user acceptance can initiate the update of the underlying database and generation of the template.

In operation 740, the controller 106 generates a template. The complete data is stored as knowledge inside of the database so that the next time a datasheet is received the mistakes from mapping are not repeated. The template is populated with algorithm items and mapped parameters after receiving the user initiation. The interface does not allow user interaction until after the template is fully populated by the controller 106.

In operation 745, the controller 106 downloads the template to the device. The template can be downloaded using an asset management system to achieve a required configuration. The template provides the device with the parameters and values for correctly measuring a flow.

In operation 750, the controller 106 operates the device using the downloaded template. The device operates with the parameters and values from the template that are received without any user interaction other than accepting the values.

Although FIG. 7 illustrates one example of a method 700 for configuring a flow algorithm automatically by using a primary element data sheet in a multivariable transmitter according, various changes may be made to FIG. 7. For example, various steps shown in FIG. 7 could overlap, occur in parallel, occur in a different order, or occur any number of times.

It may be advantageous to set forth definitions of certain words and phrases used throughout this patent document. The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for configuring a flow algorithm by using a primary element data sheet in a multivariable transmitter, comprising:
a memory; and
one or more processors operably connected to the memory, the one or more processors operable to:
receive a datasheet and an algorithm related to a device in an industrial process and control system;
select an algorithm standard using an interface including an asset/device manager input to provide a datasheet input and a datasheet type input,
receive, using the interface, a user initiation to initiate reception of the datasheet and the algorithm including vendor details, primary element data and an algorithm type;
extract parameters from the datasheet;
extract device description data to prepare a symbol list based on the algorithm;
map parameters to algorithm items related to the algorithm to derive mapped parameters;
update the device description data to initiate the update of the underlying database;
generate a template based on the algorithm items and the mapped parameters;
populate the template with the algorithm items and the mapped parameters after receiving the user initiation;
allow the user to validate the template by selecting or deselecting specific items or variables in the template; and
download the template to the device.

2. The apparatus of claim 1, wherein the one or more processors are further configured to:
update a database with new keywords extracted from the datasheet.

3. The apparatus of claim 2, wherein the one or more processors are further configured to:
extract algorithm data based on the received algorithm, wherein the algorithm data includes the algorithm items.

4. The apparatus of claim 3, wherein the one or more processors are further configured to:
update the algorithm data and the mapped parameters in the database.

5. The apparatus of claim 1, wherein the interface does not allow the user initiation until the template is fully populated.

6. The apparatus of claim 1, wherein the one or more processors are further configured to:
operate the device based on the downloaded template in the device, wherein the device comprises industrial equipment.

7. A method for configuring a flow algorithm by using a primary element data sheet in a multivariable transmitter, comprising:
receiving a datasheet and an algorithm related to a device in an industrial process and control system;
selecting an algorithm standard using an interface including an asset/device manager input to provide a data sheet input and a data sheet type input,
receiving, using the interface, a user initiation to initiate reception of the datasheet and the algorithm including vendor details, primary element data and an algorithm type;
extracting parameters from the datasheet;
extracting device description data to prepare a symbol list based on the algorithm;
mapping parameters to algorithm items related to the algorithm to derive mapped parameter;
updating the device description data to initiate the update of the underlying database;
generating a template based on the algorithm items and the mapped parameters;
populating the template with the algorithm items and the mapped parameters after receiving a user initiation;
allowing a user associated with the user initiation to validate the template by selecting or deselecting specific items or variables in the template; and
downloading the template to the device.

8. The method of claim 7, further comprising:
updating a database with new keywords extracted from the datasheet.

9. The method of claim 8, further comprising:
extracting algorithm data based on the received algorithm, wherein the algorithm data includes the algorithm items.

10. The method of claim 9, further comprising:
updating the algorithm data and the mapped parameters in the database.

11. The method of claim 7, further comprising: populating the template with algorithm items and mapped parameters after receiving the user initiation, wherein the interface does not allow the user initiation until the template is fully populated.

12. The method of claim 7, further comprising:
operating the device based on the downloaded template in the device, wherein the device comprises industrial equipment.

13. A non-transitory machine-readable medium encoded with executable instructions for configuring a flow algorithm by using a primary element data sheet in a multivariable transmitter that, when executed, cause one or more processors to:
receive a datasheet and an algorithm related to a device in an industrial process and control system;
select an algorithm standard using an interface including an asset/device manager input to provide a datasheet input and a datasheet type input;
receive, using the interface, a user initiation to initiate reception of the datasheet and the algorithm including vendor details, primary element data and an algorithm type;
extract parameters from the datasheet;
extract device description data to prepare a symbol list based on the algorithm;
map parameters to algorithm items related to the algorithm to derive mapped parameter;
update the device description data to initiate the update of the underlying database;
generate a template based on the algorithm items and the mapped parameters;
populate the template with the algorithm items and the mapped parameters after receiving a user initiation;
allow a user associated with the user initiation to validate the template by selecting or deselecting specific items or variables in the template; and
download the template to the device.

14. The non-transitory machine-readable medium of claim 13, wherein the executable instructions further cause the one or more processors to:
update a database with new keywords extracted from the datasheet.

15. The non-transitory machine-readable medium of claim 14, wherein the executable instructions further cause the one or more processors to:
extract algorithm data based on the received algorithm, wherein the algorithm data includes the algorithm items.

16. The non-transitory machine-readable medium of claim 15, wherein the executable instructions further cause the one or more processors to:
update the algorithm data and the mapped parameters in the database.

17. The non-transitory machine-readable medium of claim 13, wherein the executable instructions further cause the one or more processors to: populate the template with algorithm items and mapped parameters after receiving the user initiation, wherein the interface does not allow the user initiation until the template is fully populated.

* * * * *